United States Patent
Hsu et al.

(10) Patent No.: US 11,204,700 B2
(45) Date of Patent: Dec. 21, 2021

(54) DATA STORAGE DEVICE AND NON-VOLATILE MEMORY CONTROL METHOD, WITH SECURITY EXTENSION

(71) Applicant: Silicon Motion, Inc., Jhubei (TW)

(72) Inventors: Sung-Ling Hsu, New Taipei (TW); Chih-Yu Lin, Zhubei (TW); Hung-Ting Pan, Taoyuan (TW)

(73) Assignee: SILICON MOTION, INC., Jhubei (TW)

( * ) Notice: Subject to any disclaimer, the term of this patent is extended or adjusted under 35 U.S.C. 154(b) by 257 days.

(21) Appl. No.: 16/508,501

(22) Filed: Jul. 11, 2019

(65) Prior Publication Data
US 2020/0356284 A1 Nov. 12, 2020

(30) Foreign Application Priority Data
May 8, 2019 (TW) .................. 108115801

(51) Int. Cl.
*G06F 3/06* (2006.01)
*G06F 12/02* (2006.01)
*G06F 21/57* (2013.01)

(52) U.S. Cl.
CPC .......... *G06F 3/0622* (2013.01); *G06F 3/0655* (2013.01); *G06F 3/0679* (2013.01); *G06F 12/0246* (2013.01); *G06F 21/572* (2013.01)

(58) Field of Classification Search
None
See application file for complete search history.

(56) References Cited

U.S. PATENT DOCUMENTS

| | | |
|---|---|---|
| 9,122,498 B2 | 9/2015 | Liang |
| 2011/0131402 A1 | 6/2011 | Mittal |
| 2013/0326207 A1* | 12/2013 | Akdemir .............. G06F 21/57 713/2 |
| 2016/0092183 A1 | 3/2016 | Radigan |
| 2016/0125187 A1* | 5/2016 | Oxford .............. H04L 63/0442 713/2 |
| 2017/0180137 A1 | 6/2017 | Spanier et al. |
| 2019/0129638 A1* | 5/2019 | Murali ................. G06F 3/0659 |

FOREIGN PATENT DOCUMENTS

TW I494849 B 8/2015

* cited by examiner

*Primary Examiner* — Kaushikkumar M Patel
(74) *Attorney, Agent, or Firm* — McClure, Qualey & Rodack, LLP (57) ABSTRACT

A security extension design for non-volatile memory is shown. There is an in-system program loaded into the non-volatile memory. A memory controller downloads the in-system program to a data register to provide base firmware code, a function pointer structure and security firmware code on the data register. The memory controller executes the base firmware code, and security functions of the security firmware code are called by the base firmware code through information recorded in the function pointer structure and thereby the memory controller is switched to operate the non-volatile memory at a higher security level. The security firmware code uses an application programming interface (API) and is compatible with multiple projects.

16 Claims, 6 Drawing Sheets

DATA STORAGE DEVICE AND NON-VOLATILE MEMORY CONTROL METHOD, WITH SECURITY EXTENSION

CROSS REFERENCE TO RELATED APPLICATIONS

This Application also claims priority of Taiwan Patent Application No. 108115801, filed on May, 8, 2019, the entirety of which is incorporated by reference herein.

BACKGROUND OF THE INVENTION

Field of the Invention

The present invention is related to security extension of non-volatile memory.

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as the storage medium in a data storage device.

In security applications, security extension for storing data at a higher security level is an important issue in the technical field.

BRIEF SUMMARY OF THE INVENTION

A security extension technology for data storage devices of various projects is proposed in the present invention.

In accordance with an exemplary embodiment of the present invention, a data storage device includes a non-volatile memory and a memory controller. The memory controller operates the non-volatile memory as requested by a host. An in-system program is loaded into the non-volatile memory. The memory controller downloads the in-system program to a data register to provide base firmware code, a function pointer structure and security firmware code on the data register. The memory controller executes the base firmware code, and security functions of the security firmware code are called by the base firmware code through information recorded in the function pointer structure and thereby the memory controller is switched to operate the non-volatile memory at a higher security level. The security firmware code may use an application programming interface (API) and is compatible with multiple projects.

The function pointer structure may include a first table and a second table. The first table lists base function addresses. The second tale lists security function addresses. The base firmware code calls security functions of the security firmware code through the second table. The security firmware code calls base functions of the base firmware code through the first table. In an exemplary embodiment, the memory controller fills the first table when executing the base firmware code. Different from the first table, the second table may originally exist in the in-system program retrieved from the non-volatile memory.

In an exemplary embodiment, when the host requests a security operation, the memory controller releases space from the data register to store the base firmware code, the function pointer structure and the security firmware code. When the security operation is finished, the memory controller may release the space storing the base firmware code, the function pointer structure and the security firmware code from the data register.

In an exemplary embodiment, the memory controller loads first-type security parameters to the data register by executing the base firmware code. The first-type security parameters depend on the project of the data storage device. A security function executed by the memory controller may load second-type security parameters to the data register. The second-type security parameters are retrieved from the non-volatile memory. After the second-type security parameters are downloaded to the data register and modified on the data register, the memory controller may execute the security firmware code to update the second-type security parameters to the non-volatile memory.

In an exemplary embodiment, the second-type security parameters are partially kept in the data register without being removed after the security operation ends. Some functions of the base firmware code may still need these security parameters.

The concept of present invention may be further used to implement a non-volatile memory control method.

In an exemplary embodiment, a control method for a non-volatile memory includes the following steps: having the non-volatile memory with an in-system program loaded on the non-volatile memory; downloading the in-system program to a data register to provide base firmware code, a function pointer structure and security firmware code on the data register; and executing the base firmware code, wherein security functions of the security firmware code are called by the base firmware code through information recorded in the function pointer structure and thereby the non-volatile memory is switched to be operated at a higher security level. The security firmware code may use an application programming interface (API) and is compatible with multiple projects.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Confidential information, such as personal information, passwords, accounts for mobile payments, etc., has security requirements. In order to meet the security requirements, data storage devices may operate according to security mechanisms and thereby confidential/non-confidential data is accessed in a proper way. For example, Trustzone is a security mechanism by which the computing core of the data storage device switches between domains at different security levels. The confidential data is protected within a high-security domain to avoid information leakage. A low-security domain is designed to store the general data (e.g. non-confidential data). In order to support the security mechanisms, the firmware of data storage device needs to be properly adjusted. The security mechanism, therefore, can be executed correctly and smoothly to provide a better user experience.

In order to speed up the data accessing of flash memory, the data storage device is typically configured to include an appropriately sized DRAM. The DRAM is provided for temporary storage of security firmware code regarding the security mechanism and thereby the execution of the security firmware code is speeded up. However, a data storage device may not include a DRAM, or the equipped DRAM is just a small-capacity DRAM, in which the smooth execution of the security firmware code is an important technical issue. In addition, the hardware specifications of the different data storage devices may have some differences. For example, there are various hardware architectures for the memory controller. Security firmware code with high compatibility to operate various data storage devices is called for. A data storage device with a small-sized DRAM may use a partial DRAM technique. Because of the limited storage space, the logical-to-physical mapping information and/or the security firmware code may not be completely stored in the DRAM.

In the present invention, the security firmware code is divided into multiple security functions according to the operational purpose or size. The base firmware code may call and execute one or several security functions through an application programming interface (API) and thereby the data storage devices operate to implement security mechanisms. The base firmware code may vary on the different data storage devices. Through the compatible API, security functions are called no matter what version the base firmware code is and thereby the security mechanisms successfully operate. Security mechanisms are easily implemented on data storage devices development time is shorten.

Figure 1:
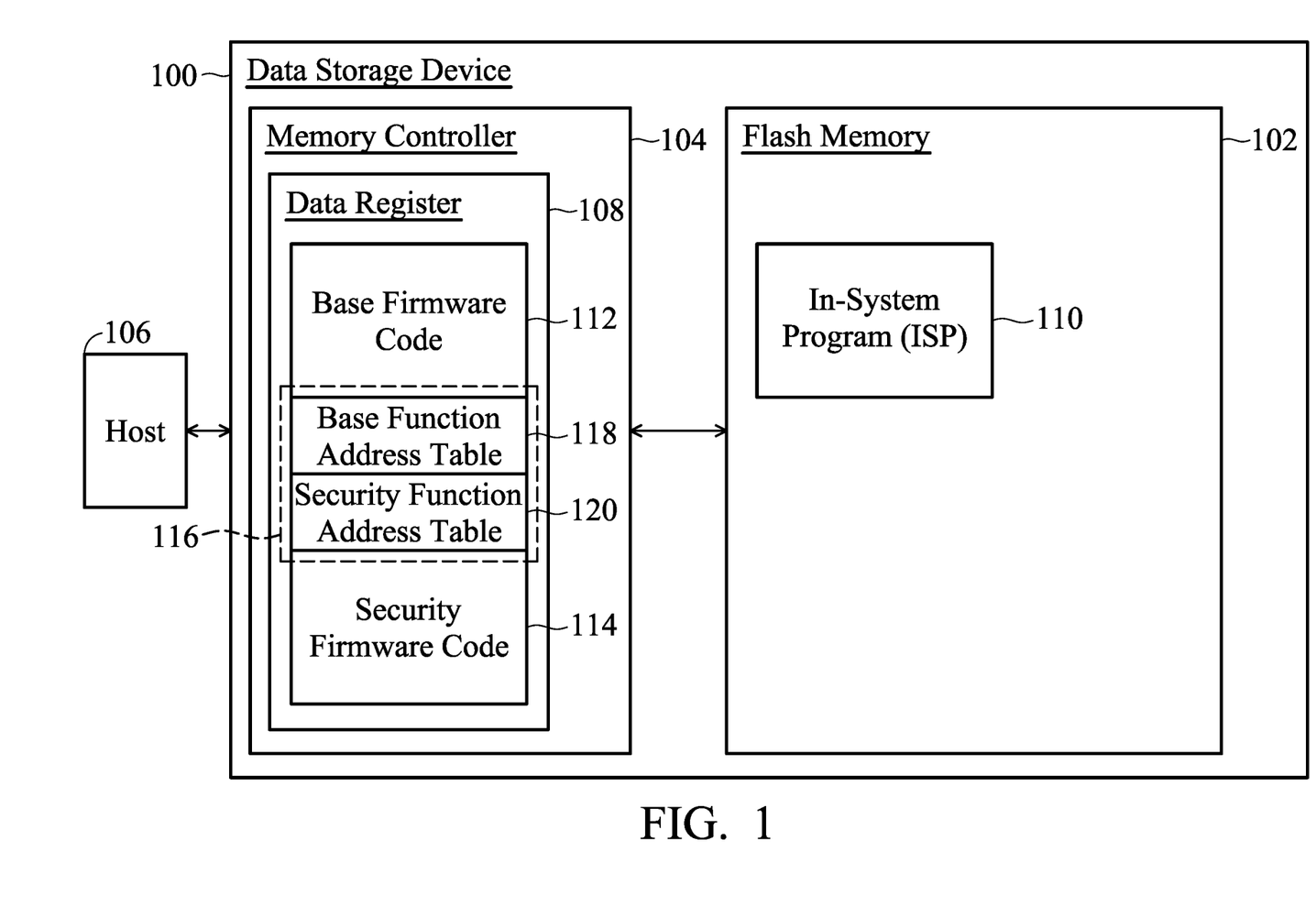
FIG. 1 is a block diagram depicting a data storage device 100 in accordance with an exemplary embodiment of the present invention.

FIG. 1 is a block diagram depicting a data storage device 100 in accordance with an exemplary embodiment of the present invention. The data storage device 100 uses a flash memory 102 as a storage medium and has a memory controller 104. The data storage device 100 may be configured to use a small capacity DRAM. The host 106 outputs a host command to the memory controller 104. According to the request issued by the host command, the memory controller 104 executes flash memory operation functions to access the flash memory 102. For example, the memory controller 104 executes read or write functions to access the flash memory 102. The execution result is returned to the host 106 in response to the host command. The host commands include security accessing commands and general accessing commands. Confidential information is accessed through the security accessing commands. Non-confidential information is accessed through the general accessing commands. The memory controller 104 has a data register 108, such as a static random access memory (SRAM), which is provided for random accessing of data.

The flash memory 102 stores an in-system program (ISP) 110, which includes base firmware code 112, security firmware code 114, and an application programming interface (abbreviated as API, preferably implemented by a function pointer structure (FPS) 116). The communication between the base firmware code 112 and the security firmware code 114 is established using the FPS 116. When the data storage device 100 is initialized, the memory controller 104 reads the base firmware code 112 from a binary file (e.g., the ISP 110) to complete the initialization. When the host 106 requests for security operations, the memory controller 104 calls the security functions from the secure firmware code 114 through the application programming interface (API) that is implemented by the functional pointer structure (FPS) 116, and thereby the security operations requested by the host 106 are performed.

The function pointer structure (FPS) 116 includes a base function address table 118 (recording the addresses of base functions in the base firmware code 112) and a security function address table 120 (recording the addresses of security functions in the security firmware code 114). The base firmware code 112 calls one or more security functions from the secure firmware code 114 in accordance with the security function address table 120. The security functions in the secure firmware code 114 may call base functions from the base firmware code 112 in accordance with the base function address table 118.

The base firmware code 112 may be modified for data storage devices of the different specs. No matter what spec the data storage device follows, security mechanism is performed on the various data storage devices by the compatible security firmware code 114 which is implemented by an application programming interface (FPS 116). There is no need to develop the exclusive security firmware code for a particular data storage device. The program developer only needs to develop the base firmware code 112 and the security requirements are met by combining the base firmware code 112 with the application programming interface (using the FPS 116) and the security firmware code 114. When a security operation is called for, the base firmware code 112 can call the security functions of the secure firmware code 114 through the application programming interface (using the FPS 116).

Figure 2A:
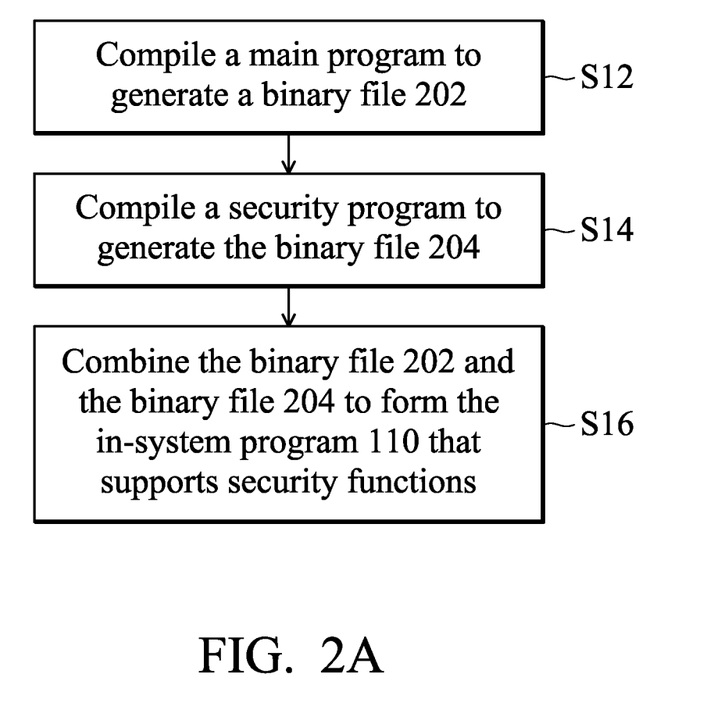
FIG. 2A is a flowchart depicting a method for establishing an in-system program (ISP) 110 that supports security functions.

FIG. 2A is a flowchart depicting a method for establishing an in-system program (ISP) 110 that supports security functions. The in-system program (ISP) 110 may be executed by the memory controller 104 of the data storage device 100 in response to the host commands issued by the host 106. The host commands may include security accessing commands and general accessing commands.

In step S12, a main program is compiled to generate a binary file 202. The binary file 202 may include a base function address table 118 that lists the base function addresses of the base firmware code 112. General accessing commands are responded by the base firmware code 112 that is placed at the beginning of the binary file 202.

In step S14, a security program is compiled to generate the binary file 204. The binary file 204 may include a security function address table 120 that lists the security function addresses of the security firmware code 114. The security function address table 120 may be placed at the beginning of the binary file 204. Security accessing commands are responded by the security firmware code 114.

Figure 2B:
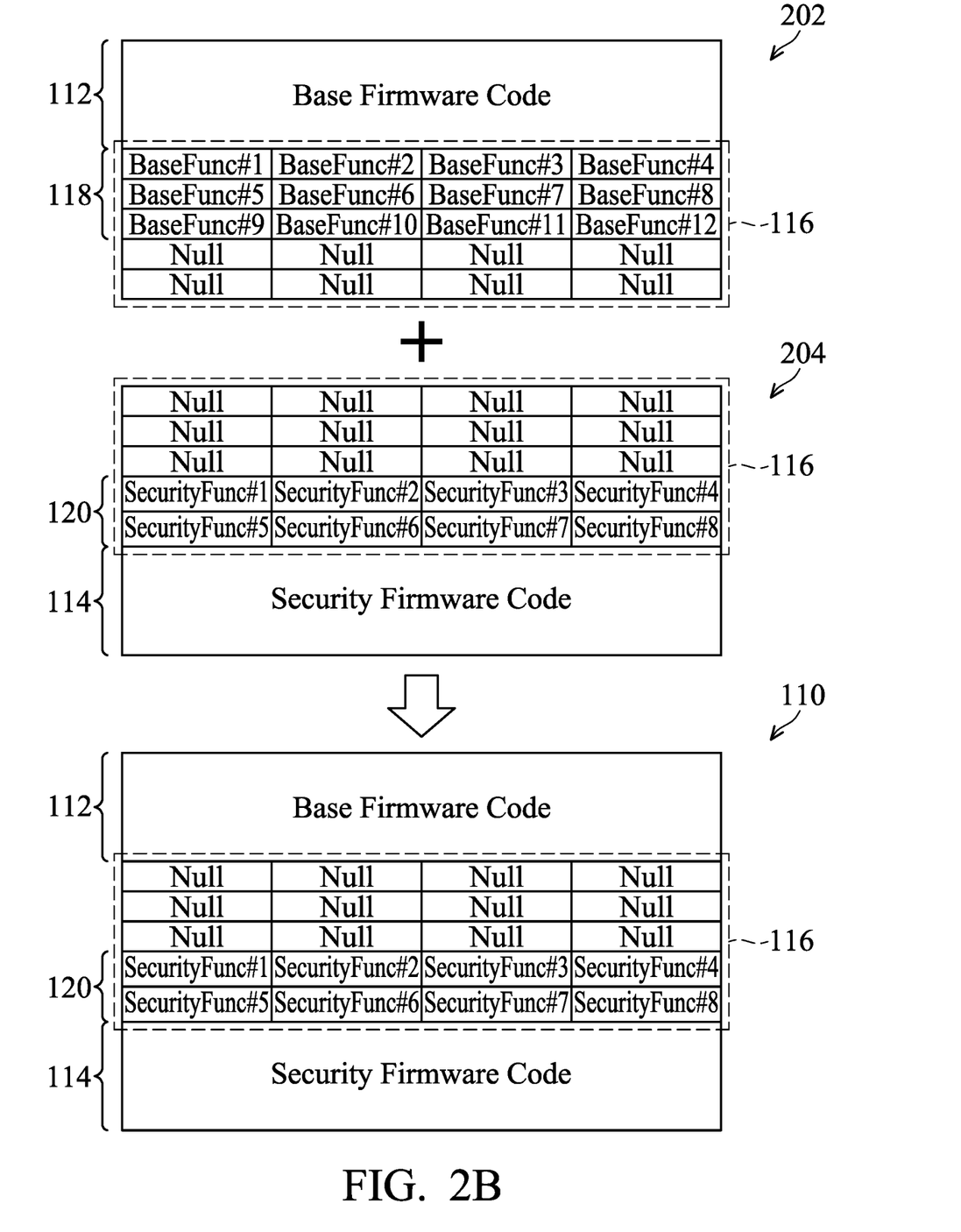
FIG. 2B illustrates the steps to establish the in-system program (ISP) 110.

Referring to FIG. 2B, the base function address table 118 is combined with the security function address table 120 to form the function pointer structure (FPS) 116. A sufficient space (larger than the size of the base function address table 118 and larger than the size of the security function address table 120) should be allocated to form the FPS 116, and the unused area is filled with Null. In an exemplary embodiment, the FPS 116 is in a size of 80B and each batch of address information is 4B. The FPS 116 is capable of storing 20 addresses. The base function address table 118 records the addresses of 12 base functions BaseFunc #1 to BaseFunc #12. The remaining 8 fields are filled with Null (referring to the binary file 202). The security function address table 120 records the addresses of eight security functions SecurityFunc #1~SecurityFunc #8. The remaining 12 fields are filled with Null (referring to the binary file 204). In the FPS 116, the space storing the base function address table 118 and the space storing the security function address table 120 are staggered.

FIG. 2A includes a step S16, by which the binary file 202 and the binary file 204 are combined to form the in-system program 110 that supports security functions. In an exemplary embodiment, the base function address table 118 of the binary file 202 is overwritten by the security function address table 120 of the binary file 204 when the binary file 204 is combined with the binary file 202. The base function address table 118 in the FPS 116 is overwritten by Null.

The base function address table 118 is rebuilt later. The memory controller 104 downloads the in-system program 110 and executes the base firmware code 112 of the in-system program 110. According to the execution of the base firmware code 112, the memory controller 104 rebuilds and updates the base function address table 118 to the in-system program 110.

In an exemplary embodiment, the security functions may call the base functions of the base firmware code 112. For example, direct memory accessing (DMA), an efficient data transfer technology, is one of the base functions of the base firmware code 112. The memory controller 104 may record the function address of the DMA function in the base function address table 118. According to the function address of the DMA recorded in the base function address table 118, a security function of the secure firmware code 114 may call the direct memory accessing (DMA) function for execution. According to a start address and a destination address requested by the security function, the DMA function is performed to determine the memory type of the accessing destination and execute the direct memory accessing. Mass data transfer, therefore, is performed in security.

Figure 2C:
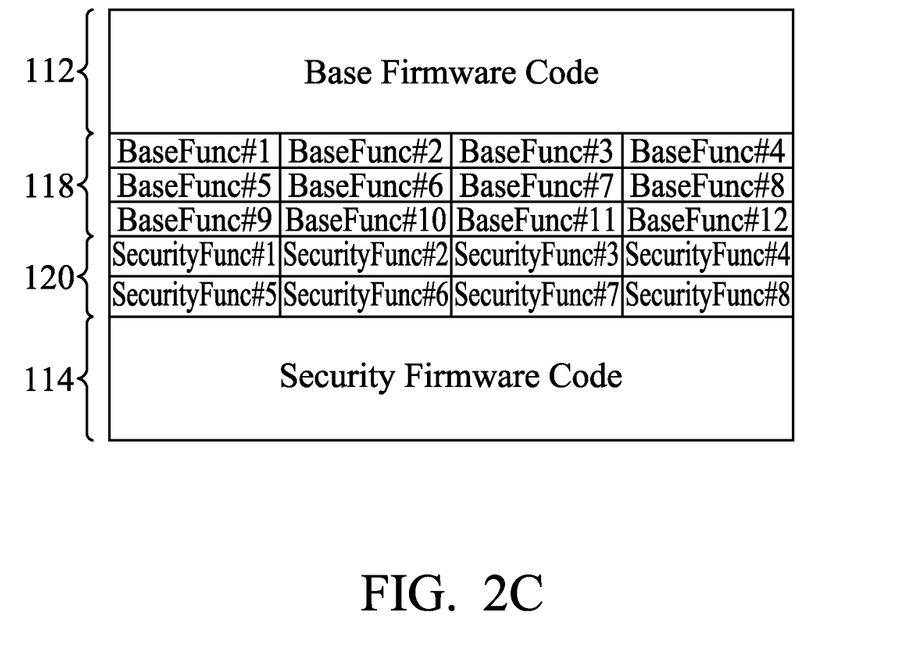
FIG. 2C illustrates the in-system program (ISP) 110 completed by the memory controller 104 on the data register 108 and, as shown, the base function address table 118 has been rebuilt.

FIG. 2C illustrates the in-system program 110 completed by the memory controller 104 on the data register 108. At this time, the memory controller 104 has filled in the contents of the base function address table 118, and the FPS 116 is successfully established.

Figure 3:
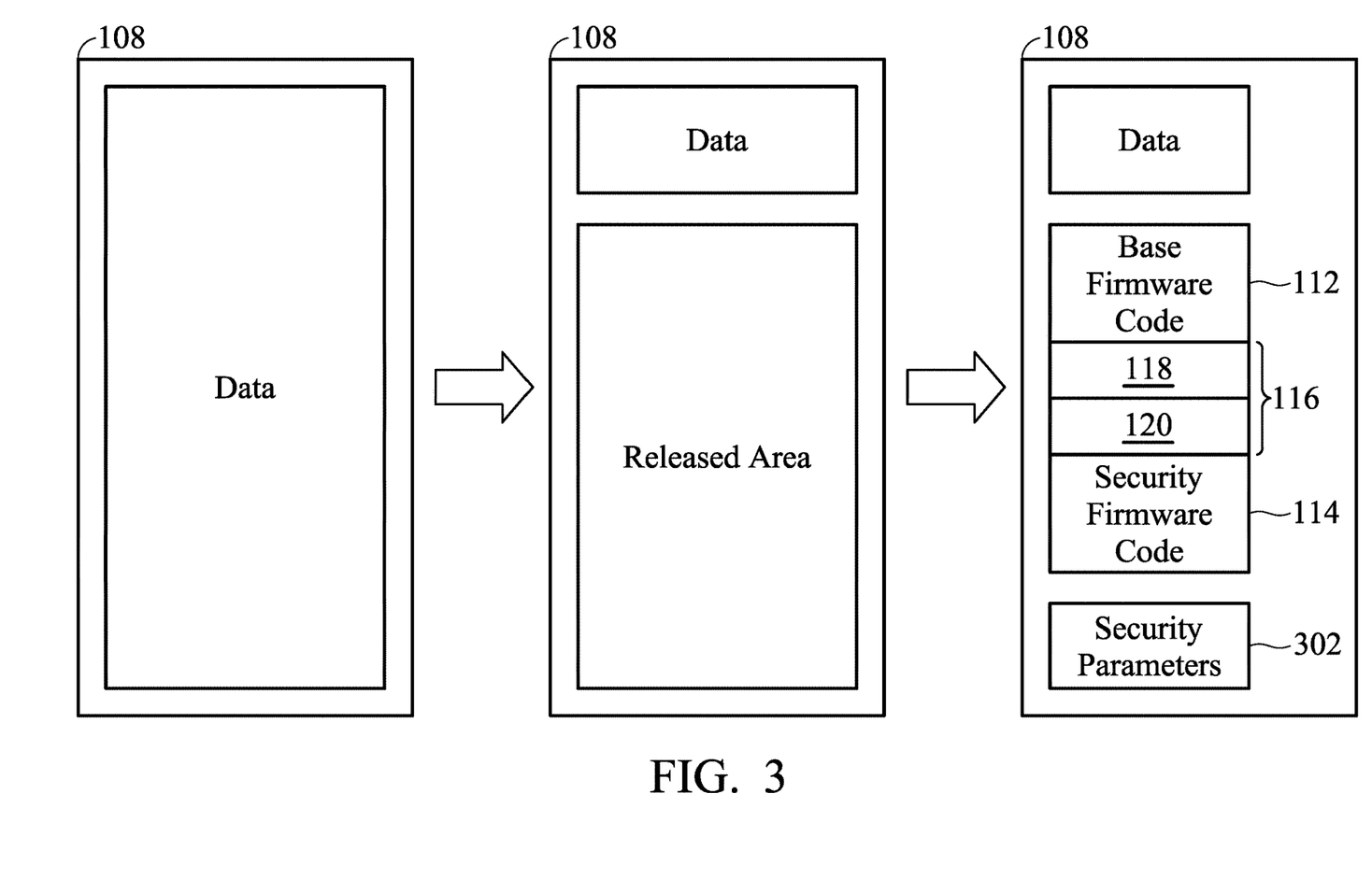
FIG. 3 depicts how the memory controller 104 operates the data register 108 in more detail.

FIG. 3 depicts how the memory controller 104 operates the data register 108 in more detail (from left to right). The data register 108 may originally be full of data. When receiving a security accessing command from the host 106, the memory controller 104 partially releases the space of the data register 108. For example, data originally stored in the data register 108 may be partially uploaded to the flash memory 102. After the space is released, the memory controller 104 downloads the base firmware code 112 (partially or wholly), the FPS 116, and the security firmware code 114 from the flash memory 102 to the data register 108. The memory controller 104 may further download security parameters 302 to the data register 108 for the execution of the security firmware code 114. The memory controller 104 executes the base firmware code 112 and, according to the function addresses recorded in the security function address table 120, the base firmware code 112 calls the security functions of the secure firmware code 114. Vice versa, according to the function addresses recorded in the base function address table 118, the security firmware code 114 calls the base functions of the base firmware code 112.

Figure 4:
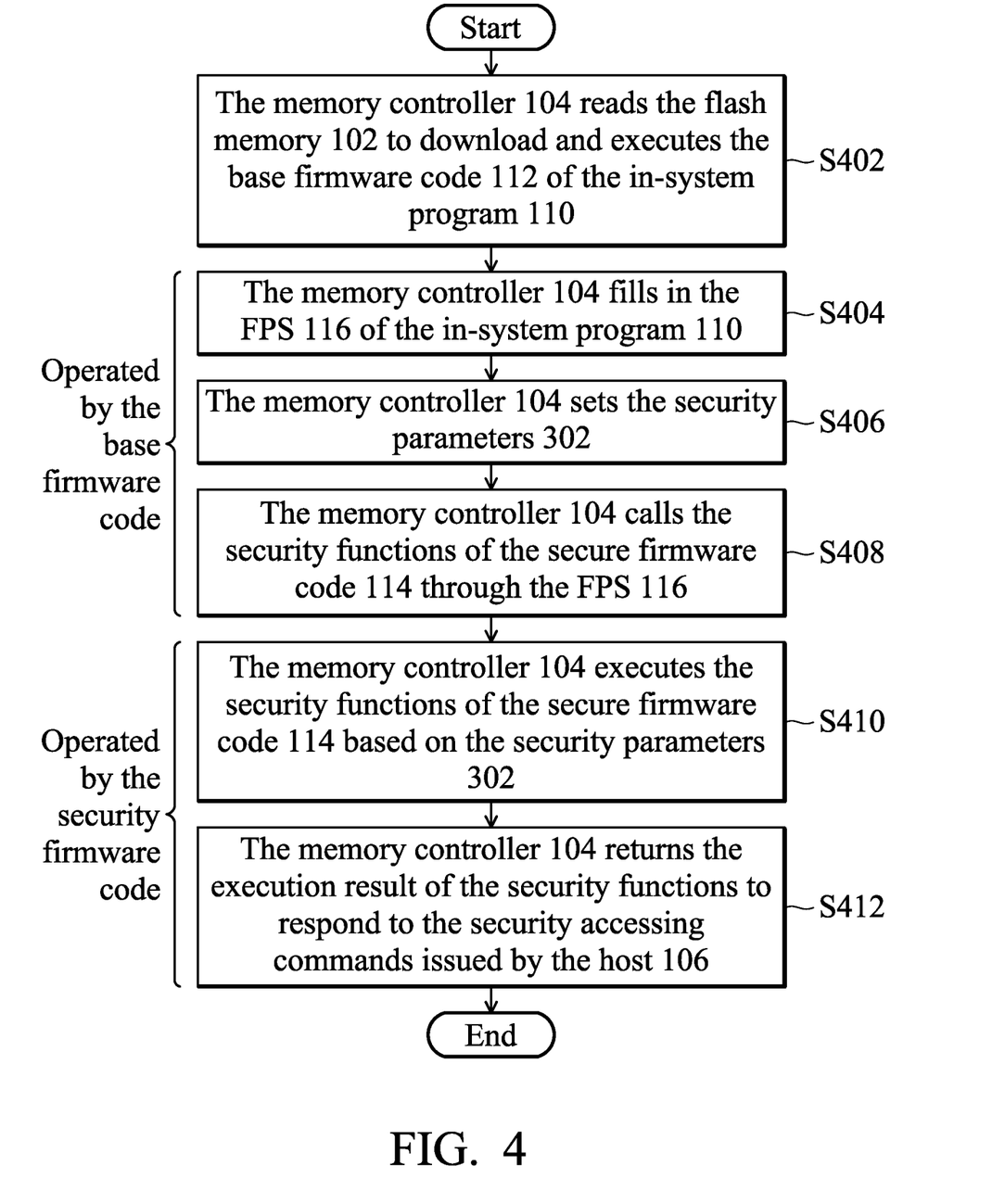
FIG. 4 is a flowchart of a security accessing method that is preferably performed by the memory controller 104 in response to a host command from the host 106.

FIG. 4 is a flowchart of a security accessing method that is preferably performed by the memory controller 104 in response to a host command from the host 106.

In step S402, the memory controller 104 reads the flash memory 102 to download and executes the base firmware code 112 of the in-system program 110. The in-system program 110 includes the base firmware code 112, the security firmware code 114, and the function pointer structure 116. The memory controller 104 reads and executes ROM code and, accordingly, reads the flash memory 102 to download the in-system program 110 to the data register 108 for execution. When the space of the data register 108 is limited, the memory controller 104 downloads and executes the in-system program 110 in segments, or only downloads and executes the base firmware code 112 of the in-system program 110.

In step S404, the memory controller 104 fills in the FPS 116 of the in-system program 110. By executing the base firmware code 112 of the in-system program 110, the memory controller 104 collects the function addresses of the base functions of the base firmware code 112, and fills the function addresses of the base functions into the FPS 116 as the base function address table 118.

In step S406, the memory controller 104 sets the security parameters 302. The memory controller 104 may set at least a part of the security parameters 302. For example, the security functions required in this project may be declared in this step to meet the needs of the user.

In step S408, the memory controller 104 calls the security functions of the secure firmware code 114 through the FPS 116. In response to a security accessing command issued by the host 106, the base firmware code 112 executed by the memory controller 104 calls the security functions of the secure firmware code 114 through the FPS 116. The security data accessing command, therefore, is responded by the execution of security functions. Steps S404~S408 are preferably performed by the execution of the base firmware code 112. Step S410 is preferably performed by the execution of the security firmware code 114.

In step S410, the memory controller 104 executes the security functions of the secure firmware code 114 based on the security parameters 302. The memory controller 104 may further use the DMA function or the flash memory operation functions to get the security parameters 302 required in the execution of the security functions. During the execution of the security functions of the secure firmware code 114, the memory controller 104 can call the base functions of the base firmware code 112 according to the base function address table 118 obtained from the FPS 116. The base functions may be the DMA function, the flash memory operation functions, and the like.

In step S412, the memory controller 104 returns the execution result of the security functions to respond to the security accessing commands issued by the host 106. The memory controller 104 executes the security functions of the secure firmware code 114 in which the base functions of the base firmware code 112 are called and executed to operate the flash memory 102. For example, after reading or writing confidential information from or to the flash memory 102, an execution result (e.g. successful read/write, or read/write failed) may be used to respond to the security accessing command. In another example, the memory controller 104 executes security functions of the secure firmware code 114 to update the password, user rights, etc. according to a security accessing command. The base functions of the base firmware code 112 are called to write the updated password and user authority to the flash memory 102. The execution result of the writing of the flash memory 102 is returned to the host 106 in response to the security accessing command issued by the host 106.

After responding to the security accessing command issued by the host 106, the memory controller 104 may release the data register 108 space occupied by the secure firmware code 114. In some exemplary embodiments, some of the security parameters 302 may be kept in the data register 108 for the execution of the base functions.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a memory controller, operating the non-volatile memory as requested by a host,
wherein:
an in-system program is loaded into the non-volatile memory;
the memory controller downloads the in-system program to a data register to provide base firmware code, a function pointer structure and security firmware code on the data register;
the memory controller executes the base firmware code, and security functions of the security firmware code are called by the base firmware code through information recorded in the function pointer structure and thereby the memory controller is switched to operate the non-volatile memory at a higher security level;
the security firmware code uses an application programming interface and is compatible with multiple projects;
the function pointer structure includes a first table and a second table;
the first table lists base function addresses;
the second tale lists security function addresses;
the base firmware code calls security functions of the security firmware code through the second table; and
the security firmware code calls base functions of the base firmware code through the first table.

2. The data storage device as claimed in claim 1, wherein:
the memory controller fills the first table when executing the base firmware code.

3. The data storage device as claimed in claim 2, wherein:
the second table exists in the in-system program retrieved from the non-volatile memory.

4. The data storage device as claimed in claim 3, wherein:
when the host requests a security operation, the memory controller releases space from the data register to store the base firmware code, the function pointer structure and the security firmware code; and
when the security operation is finished, the memory controller releases the space storing the base firmware code, the function pointer structure and the security firmware code from the data register.

5. The data storage device as claimed in claim 4, wherein:
by executing the base firmware code, the memory controller loads first-type security parameters to the data register; and
the first-type security parameters depend on a project of the data storage device.

6. The data storage device as claimed in claim 5, wherein:
a security function executed by the memory controller loads second-type security parameters to the data register; and
the second-type security parameters are retrieved from the non-volatile memory.

7. The data storage device as claimed in claim 6, wherein:
after the second-type security parameters are downloaded to the data register and modified on the data register, the memory controller executes the security firmware code to update the second-type security parameters to the non-volatile memory.

8. The data storage device as claimed in claim 7, wherein:
the second-type security parameters are partially kept in the data register without being removed after the security operation ends.

9. A control method for a non-volatile memory, comprising:
having the non-volatile memory with an in-system program loaded on the non-volatile memory;
downloading the in-system program to a data register to provide base firmware code, a function pointer structure and security firmware code on the data register; and
executing the base firmware code, wherein security functions of the security firmware code are called by the base firmware code through information recorded in the function pointer structure and thereby the non-volatile memory switches to a higher security level;
wherein:
the security firmware code uses an application programming interface and is compatible with multiple projects;
the function pointer structure includes a first table and a second table;

the first table lists base function addresses;

the second tale lists security function addresses;

the base firmware code calls security functions of the security firmware code through the second table; and the security firmware code calls base functions of the base firmware code through the first table.

10. The control method for a non-volatile memory as claimed in claim 9, further comprising:

filling the first table when executing the base firmware code.

11. The control method for a non-volatile memory as claimed in claim 10, wherein:

the second table exists in the in-system program retrieved from the non-volatile memory.

12. The control method for a non-volatile memory as claimed in claim 11, further comprising:

when the host requests a security operation, releasing space from the data register to store the base firmware code, the function pointer structure and the security firmware code; and when the security operation is finished, releasing the space storing the base firmware code, the function pointer structure and the security firmware code from the data register.

13. The control method for a non-volatile memory as claimed in claim 12, further comprising:

loading first-type security parameters to the data register by executing the base firmware code, wherein the first-type security parameters depend on a project of the data storage device.

14. The control method for a non-volatile memory as claimed in claim 13, further comprising:

executing a security function to load second-type security parameters to the data register, wherein the second-type security parameters are retrieved from the non-volatile memory.

15. The control method for a non-volatile memory as claimed in claim 14, wherein:

after the second-type security parameters are downloaded to the data register and modified on the data register, the second-type security parameters are updated to the non-volatile memory by executing the security firmware code.

16. The control method for a non-volatile memory as claimed in claim 15, wherein:

the second-type security parameters are partially kept in the data register without being removed after the security operation ends.

* * * * *